United States Patent [19]
Crooks

[11] 3,838,290
[45] Sept. 24, 1974

[54] OZONE GENERATING MEANS
[76] Inventor: Gary V. Crooks, 1702 Olive St., Santa Barbara, Calif. 93101
[22] Filed: Dec. 29, 1972
[21] Appl. No.: 319,220

Related U.S. Application Data
[63] Continuation-in-part of Ser. No. 154,514, June 18, 1971, abandoned.

[52] U.S. Cl. ............................................. 250/532
[51] Int. Cl. ........................................... C01b 13/12
[58] Field of Search ........................... 250/532–541; 204/284

[56] References Cited
UNITED STATES PATENTS

| | | | |
|---|---|---|---|
| 1,396,222 | 11/1921 | Lindemann | 250/532 |
| 3,309,304 | 3/1967 | Caplan | 250/532 |
| 3,457,159 | 7/1969 | Fortier | 250/532 |
| 3,567,620 | 3/1971 | Ingram | 250/532 |
| 3,607,709 | 9/1971 | Rice | 250/532 |

FOREIGN PATENTS OR APPLICATIONS

| | | | |
|---|---|---|---|
| 17,885 | 0/1903 | Great Britain | 250/532 |
| 665,853 | 1/1952 | Great Britain | 250/532 |

*Primary Examiner*—T. M. Tufariello
*Attorney, Agent, or Firm*—Lyon & Lyon

[57] ABSTRACT

An ozone generator producing silent electric discharges uses wire mesh electrodes between which a dielectric sheet is maintained sandwiched by individual bus bars contacting a corresponding wire mesh electrode. A plurality of such assemblies mounted in spaced relationship to each other for the flow of air therebetween is disposed within a cylindrical chamber through which air for ozonizing and cooling is circulated.

6 Claims, 5 Drawing Figures

PATENTED SEP 24 1974 3,838,290

INVENTOR
GARY V. CROOKS

BY *Lyon+Lyon*

ATTORNEYS

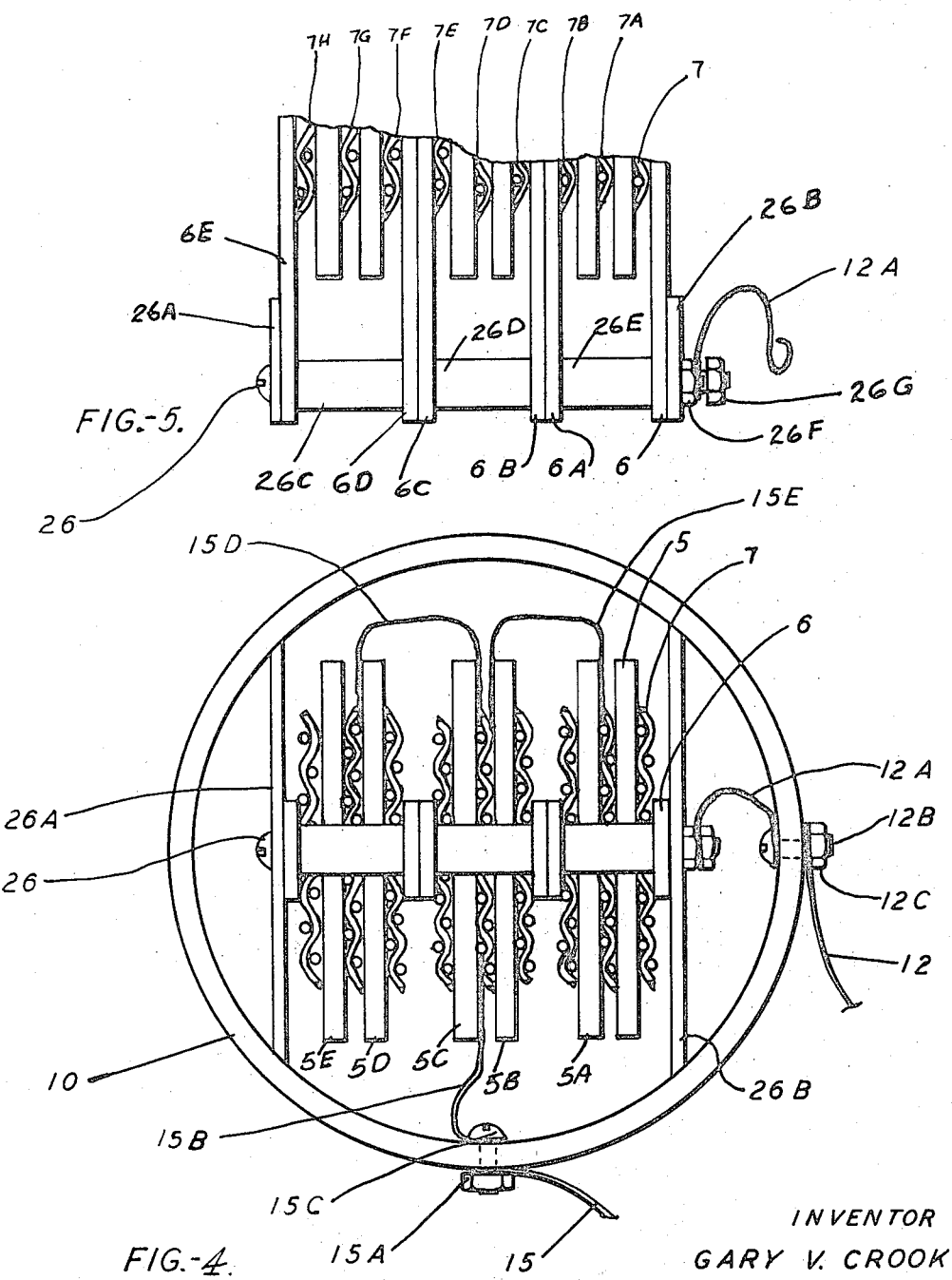

OZONE GENERATING MEANS

The present application is a continuation-in-part of my pending patent application Ser. No. 154,514 filed June 18, 1971 now abandoned.

An object of the present invention is to provide an improved ozone generating system characterized by its simplicity and efficiency.

Another object of the present invention is to provide an ozone generating system that requires no extraneous cooling means other than the air passing therethrough for ozone producing purposes.

Another object of the present invention is to provide an ozone generating system capable of producing ozone with minimum entrained impurities whereby the same may be used for medical purposes, in the purification of water, sewage treatment and other applications required by industry.

Another object of the present invention is to provide an improved ozone generating system requiring relatively small voltage.

Another object of the present invention is to provide an improved ozone generating system which can be constructed in modular form and which permits optimum air flow for cooling without the necessity of supplying high velocity air which would decrease the ozone concentration and decrease efficiency and which also provides maximum area for generation of ozone.

Another object of the present invention is to provide an ozone generating system which is capable of generating copious amounts of ozone using improved equipment which is efficient, lightweight and portable so that the same may be used in applications previously considered impractical, particularly where water cooled systems were previously required.

Another object of the present invention is to provide a system of this character which operates not only at the commercial frequency of sixty cycles per second but which also operates efficiently at higher frequencies such as, for example, 400 cycles per second.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGS. 4 and 5 illustrate the manner in which individual electrode-bus bar assemblies may be mounted together as a unit for disposition in the cylindrical chamber in FIG. 3.

Figure 1:
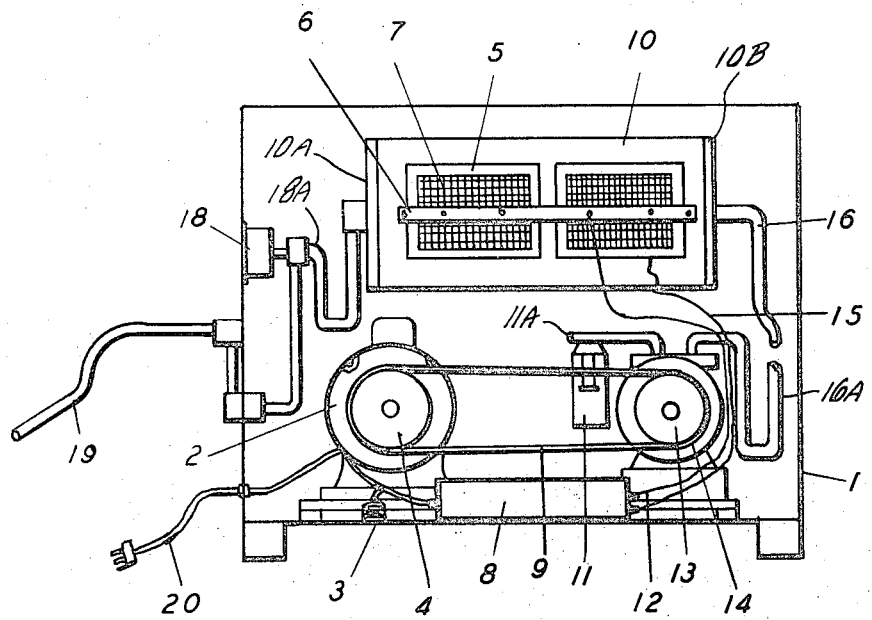
FIG. 1 illustrates a system embodying features of the present invention.

The generator involves a series of pairs of electrodes 7,7A of wire mesh between which is sandwiched and clamped a sheet of dielectric material 5. Such clamping is accomplished using rigid rectangular bar stock of conducting material in the nature of bus bars 6,6A that extend generally centrally of the rectangular shaped wire mesh and rectangular insulating sheets 5.

The bus bar 6 is insulated from bus bar 6A and the same bus bars may be used to clamp a like electrode assembly 22 spaced along these bus bars from a like electrode assembly 23.

Figure 3:
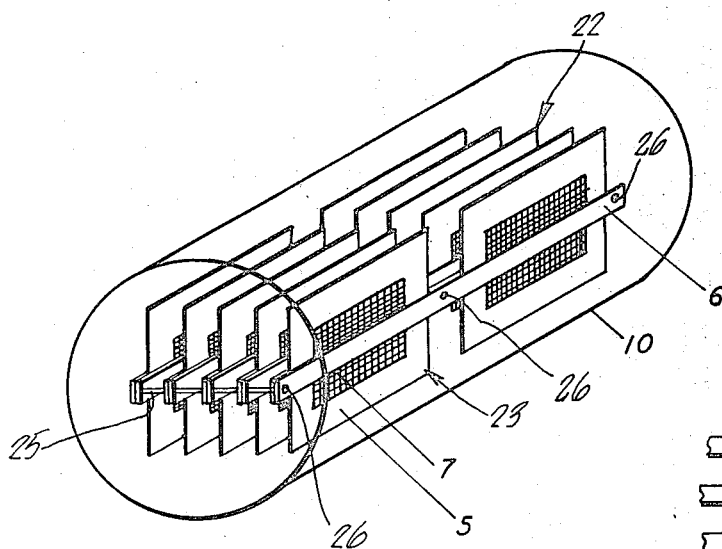
FIG. 3 is a perspective view of a portion of the apparatus shown in FIG. 1.
Figure 2:
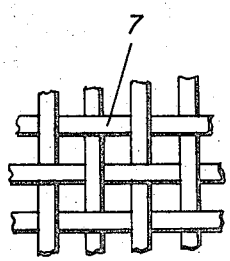
FIG. 2 illustrates the nature of the wire mesh used as electrodes in FIG. 1.

Also in accordance with other features of the present invention, a plurality of such electrode-bus bar assemblies may be stacked in spaced relation by the use of mounting rods 25, one of which is exemplified in FIGS. 3 and 4. It will be appreciated that such mounting may take different forms, and the one now presently described in detail is exemplary of others which may be used for the same purpose.

In FIG. 4 electrical cable 12 is attached to chamber 10 by bolt 12B and nut 12C which also connects electrical conductor 12A by nuts 26F and 26G, FIG. 5, to stainless steel bolt 26 which holds one end of the assembly together. There are two other similar bolts in the assembly in FIG. 3; one at mid-section and one at the other end. Elements 26C-D and E are spacers confined by bolt 26. Bolt 26 is a conductor for all of the following grids that are riveted to bus bars 7,7B,7C,7E,7F and 7H as shown-many more units can be thus secured as will be appreciated.

Electrical conductor 15 energized by transformer 8, FIG. 1, is attached to housing 10 by bolt 15C and nut 15A and also connects to electrical conductor 15B which energizes the following grids: 7D directly and through jumper 15D grid 7G is energized; and through jumber 15E grid 7A is energized. Thus all of the grids are energized at both ends of the tube 10 by interconnecting leads and jumpers as required regardless of the number of stages. Each of the grids 7.7A,7B,7C,7D-,7E,7F,7G, and 7H are kept from shorting out by insulators 5,5A,5B,5C,5D, and 5E as shown in FIG. 4. These insulators may be of mica, boro-silica glass, or many other similar compounds. Elements 26A and 26B are aluminum supports, FIG. 5, that are held in position by bolt 26 and spacers 26C,26D, and 26E against bus bars 6E,6D,6C,6B, and 6 respectively. These elements 26A and B at both ends of tube 10 support the weight of the internal tube assembly to keep it from shifting about and to protect the electrical connections when the unit is in transport. Since this is a portable unit that can be stacked in modular form, it is important that the unit be well supported internally. The advantage of assembly shown in FIGS. 4 and 5 is that it provides a large area of grid per given space—thus the volume of ozone produced per given size of tube is indeed large.

Thus the individual electrode assemblies, shown as being 10 in number in FIG. 3, are stacked in spaced relationship both lengthwise and in depth and are inserted within a tubular chamber 10 closed by end closure members 10A,10B. Air to be ozonized is passed through this chamber with the electrodes energized as presently described.

The chamber 10 is mounted within a housing or frame 1 which serves also to support a motor 2 with its pulley 4, a pump 14 with its pulley 13, and a transformer 8. An electric input cord 20 is connected to motor 2 and then to the primary winding of transformer 8. The pulleys 4 and 13 are interconnected by drive belt 9. Opposite terminals of the secondary winding of transformer 8 are connected via leads 12 and 15 to electrodes 7,7A respectively of each electrode assembly.

An air filter 11 is interposed in the air inlet conduit 11A leading to the inlet of pump 14. The outlet of pump 14 is transferred to the inlet conduit 16 of chamber 10 via a series of U-shaped conduit sections 16A that serve generally the function of a trap to trap water and moisture and to prevent it from entering chamber 10.

The chamber outlet conduit 18A may include U-shaped trap sections 18A leading to the outlet tube 19. A pressure gauge 18 may be connected in this outlet line to indicate outlet pressure.

The wire mesh screens 7,7A of identical construction may be of wire having a diameter of 0.041 inch (forty-one thousandths of an inch) and may be of aluminum or an aluminum alloy bearing oxygen or other oxygen bearing metal.

Oxygen bearing metal is definitely preferred. The use of such metal allows operation in environments where little or no oxygen (outside of the metal) exists.

The metal or metal alloy in its processing is combined with oxygen in for example processes described in the publication "The Nature of Metals" by Bruce A. Rogers, Iowa State University Press 1964. As explained in that publication a gas such as oxygen may go into solution into a metal by what may be termed absorption. For the particular present use in the ozone generator palladium or aluminum or an aluminum alloy may be the oxygen bearing metal, i.e., oxygen is in solution in the palladium metal using techniques described in that publication, particularly page 109.

It is considered that the oxygen is in solution throughout the metal and not merely on the surface of the metal. Such oxygen in the electrodes of the ozone generator is believed to be liberated when and as the ozone is being produced as a result of application of voltage between the electrodes, i.e., application of the electrical impulse to the electrodes.

It will be noted from the foregoing that the term oxygen bearing metal has reference to a metal such as for example aluminum, palladium in which oxygen is in volumetric solution.

The oxygen in the metal is an additional source of oxygen where there is a surrounding gas containing oxygen. In some instances the oxygen in the metal may be the sole source for at least a limited time.

Oxygen bearing aluminum and/or palladium is preferred. Aluminum is particularly preferred because of its low coefficient of resistivity, particularly in comparison with that of stainless steel. In contrast, less heat is developed in the aluminum and consequently more energy is available for ozone production. Also because there is less heat loss, the efficiency and life of the aluminum grids is superior to, for example, stainless steel grids.

Further, aluminum is preferred over for example copper or brass or stainless steel because the ozone produced using aluminum electrodes is purer. In contrast when copper, brass or stainless steel electrodes are used there may be dangerous oxides formed such as the oxides of copper or for example oxides of nickel or chromium. The purity of ozone is of vital importance in some applications for example in the purification of air and water.

In conventional ozonizers, ozone is formed only from the breakdown of oxygen in the air passing by the electrodes. In accordance with important features of the present invention in which oxygen bearing electrodes are used extra oxygen is supplied thereby increasing the amount of ozone that is generated from a particular air sample.

It is considered that at the instant the electrical energy is cut off the aluminum grids absorb oxygen molecules which are in the vicinity and these oxygen molecules are liberated in subsequent applications of electrical energy or electrical impulse between the electrode grids. Indeed there is a recycling of oxygen onto and from the oxygen bearing electrodes.

It has been observed that repeated use of the ozonizer, i.e., alternate application of electric energy followed by shut down, etc., results in an etching of the aluminum grid, and this has the advantage that the etching increases the surface area on which oxygen may be absorbed. Further, aluminum grids comprising wires of a diameter of 0.041 inches is particularly useful when the voltage is 7,500 volts since it has been found that optimum conditions occur when this particular relationship is observed.

The transformer output voltage may be 7.500 volts at 30 milliamperes. The frequency is 60 cycles per second, but efficient operation is obtained also at 400 cycles per second. The system produces what may be termed silent arc discharges in which corona is produced between an electrode and the dielectric. The corona glows purple and is considered to consist of electrons or ions being collected and stored by the dielectric. It is considered that there is no discharge through the insulation, the insulation serving to collect charges of electrons or ions on its surface during one half cycle of the alternating current which is subsequently released during the next succeeding half cycle when the polarity reverses.

A current overload device 3 may be connected to the motor 4 to act as a safety device in, for example, line power problems or pump damage or failure.

I claim:

1. An ozone generator including an electrode assembly wherein electrodes are on opposite sides of a dielectric and wherein at least one of such electrodes is of wire mesh, said wire mesh being of oxygen bearing metal with the oxygen being in solution throughout the metal and not merely on the surface of the metal.

2. A system as set forth in claim 1 wherein both electrodes are of wire mesh.

3. A system as set forth in claim 1 in which said one electrode is of eight mesh wire having a diameter of approximately 0.041 inches.

4. A generator as set forth in claim 1 wherein said one electrode is of aluminum.

5. A generator as set forth in claim 1 wherein said one electrode is of aluminum alloy.

6. A generator as set forth in claim 1 wherein the oxygen bearing metal is palladium.

* * * * *